United States Patent Office 2,868,755
Patented Jan. 13, 1959

2,868,755

SYNTHETIC LATEX CONTAINING A VINYL EMULSIFYING AGENT AND PROCESS OF PREPARATION

Avrom I. Medalia, Newton, Mass.

No Drawing. Application January 14, 1958
Serial No. 708,744

17 Claims. (Cl. 260—29.7)

This invention relates to an improved process for polymerizing polymerizable unsaturated hydrocarbons, and more in particular it relates to the polymerization of vinyl or vinylidene compounds in the presence of a new class of compounds known as vinyl emulsifying agents.

Heretofore vinyl monomers have been polymerized in the form of an emulsion, that is, the monomers have been dispersed in a liquid, which liquid acts as a dispersing medium, and have been so polymerized that the micelles which are formed in the dispersing medium are the initial locus of the polymerization.

Emulsifying agents such as soap have been extensively used in water as a dispersing agent. Suitable initiating agents are added to this emulsion of the monomer in water, which results in the formation of polymer particles, which are protected from coagulation by a film of adsorbed emulsifying agent. The suspension of such protected polymer particles is termed a synthetic latex. The emulsifying agent thus functions initially to dissolve the monomer in the micelles formed in the dispersing medium and subsequently to protect the polymer so formed.

Soap, such as potassium laureate and sodium abietate etc. is in no case chemically bound to the polymer but is simply adsorbed on the surface of the polymer particles and when the resulting latex is coagulated, as for example by adding acids or multi-valent cations, the emulsifying agent contributes nothing to the strength or adhesion of the polymer, but instead may itself or from the decomposition products formed continue to protect the particles from one another in the coagulum. The reaction product of the emulsifying agent with certain coagulating agents migrates within the solid polymer to form aggregates which further weaken the mechanical properties of the When the latex is evaporated as a film, migration of the emulsifying agent to the surface of the film has a deleterious effect upon several properties such as adhesion and resistance to water spotting.

It is an object of the present invention to prepare a latex of improved properties by the process of emulsion polymerization in the presence of an emulsifying agent which is capable of copolymerizing with the monomer or monomers emulsified in the dispersing medium.

It is also an object of the present invention to utilize an emulsifying agent that will be bound to the polymer in such a manner as to prevent migration of the dispersing agent on coagulation and thus avoid the difficulties encountered in the use of soap as an emulsifying agent.

The vinyl emulsifying agents used herein contain a $CH_2=C<$ group where at least one of the disconnected valences is attached to an electro negative group, which group substantially increases the electrical dissymmetry or polar character of the molecule; such groups as phenyl, chloro, cyano, and vinyl etc. have been found to function in this manner. All of these groups are electron attracting groups. Compounds of this type are disclosed in my copending application Serial No. 389,870, filed November 2, 1953. The potassium salts are prepared by subjecting the methyl ester, such as methyl phenylundecanoate to the following successive steps, acetylation, reduction, dehydration and saponification.

The vinyl emulsifying agents as defined above may be used to form an emulsion of one or more other monomers in a dispersing medium in which they act as an emulsifying, solubilizing and protective agent and become chemically bound to the polymer, thus avoiding the above-mentioned difficulties encountered with the usual soap emulsifying agent. Examples of such vinyl emulsifying agents are potassium p-styryl undecanoate, sodium p-styryl hexanoate and sodium 14-vinyl-14-pentadecanoate. The ordinary emulsifying agents such as sodium and potassium soaps of oleic, eleostearic, or undecylenic acid, are not vinyl emulsifying agents in the present sense as these compounds do not contain an electro negative group attached to the vinyl group and therefore do not copolymerize with vinyl monomers under the conditions of emulsion polymerization.

Further examples of vinyl emulsifying agents are the soaps formed by neutralization of the reaction products of acrylonitrile with either oleic acid or 12-hydroxystearic acid (hydrogenated ricinoleic acid). The reaction between acrylonitrile and oleic acid has been carried out by Roe and Swern (J. Am. Chem. Soc. 75, 5479 (1953)). The reaction between acrylonitrile and 12-hydroxystearic acid has been carried out in a similar manner. The two products have been identified by acidimetric titration and by infra-red absorption as positional isomers of acrylamidostearic acid. The products of these two reactions have been shown to be different both by infra-red absorption and by virtue of the fact that the product from oleic acid is an uncrystallizable oil, whereas that from 12-hydroxystearic acid is a solid melting at 76–85° C. Although the positional isomerism of these compounds has not been established unequivocally the product from oleic acid will be referred to as 10-acrylamidostearic acid, and to that from 12-hydroxystearic acid as 12-acrylamidostearic acid.

The invention will be more clearly understood from the following examples.

EXAMPLE 1

| Ingredients: | Parts by weight |
|---|---|
| Butadiene | 100 |
| Water | 140 |
| p-Styryl undecanoic acid | 3.18 |
| Potassium hydroxide | Equivalent amount |
| Viscosity control agent | 0.3 |
| Chain transfer agent | 0.4 |
| Initiator | 0.1525 |

The ingredients listed above were agitated together at a temperature of 5° C. At various times samples were withdrawn for test. In the above example:

Viscosity control agent:
  Potassium chloride.
Chain transfer agents:

| Tert-dodecyl mercaptan | 0.1 |
|---|---|
| Tert-tetradecyl mercaptan | 0.1 |
| Tert-hexadexyl mercaptan | 0.2 |

Initiator "Redox system":

| Di-isopropyl benzene hydroperoxide | 0.1 |
|---|---|
| Diethylene triamine | 0.05 |
| Ferric iron (as nitrate) | 0.0005 |
| Ethylene diamine tetracetic acid | 0.002 |

All of the above ingredients are well known standard practice. The novel feature is the emulsifying agent which in this example is the potassium salt of p-styryl undecanoic acid.

A sample was withdrawn at various times and a small amount of a short-stop was added to the latex, which was then evaporated to dryness to permit calculation of the percent conversion, that is, the percentage of the monomer (butadiene) which had been converted into the polymer. Other samples were coagulated in ethanol and after filtration and washing with ethanol the dissolved soap in the ethanol was titrated with hydrochloric acid, using bromphenol blue as an indicator. Separate experiments showed that no more soap could be extracted from the ethanol coagulated polymer by the conventional ethanol toluene azeotropic extraction procedure, these experiments thus showed that all the unbound soap entered the ethanol in which the latex was coagulated.

A separate determination of the concentration of potassium p-styryl undecanoate in the ethanol filtrate was also made spectrophotometrically, by measuring the intensity of absorption of ultraviolet light at a wave length characteristic of the styrene portion of the p-styryl undecanoic acid molecule (253 millimicrons).

Another type of determination was made by dissolving the ethanol coagulated polymer in chloroform, re-precipitating the polymer with ethanol (in order to remove small amounts of occluded monomeric potassium p-styryl undecanoate, which would otherwise interfere with the subsequent determination), then re-dissolving the polymer in chloroform, and determining the ultraviolet absorption of the co-polymerized p-styryl undecanoic acid in the polymer, at a wavelength characteristic of the dialkyl substituted benzine ring (266 millimicrons). The results of these determinations are given in Table I.

Table I.—Determination of p-styrylundecanoic acid in polybutadiene latex

| Time at 5° C. | Percent Conversion | Soap extracted a (titration) | Soap extracted a (Spectrophotometric) | Soap Copolymerized a (Spectrophotometric) |
|---|---|---|---|---|
| | | Percent | Percent | Percent |
| 6 hrs | 21 | 68 | 42 | 15 |
| 18 hrs | 64 | 40 | 18 | 37 |
| 26 hrs | 88 | 34 | 17 | 40 | a Percent of soap charged.

With increasing conversion the percentage of soap extracted in ethanol decreased, and the percentage of soap bound in the polymer increases. These results show that the potassium p-styrylundecanoate continues to enter the polymer as polymerization proceeds.

The above results indicate that the polymer formed in the earlier stages of the reaction is a copolymer of butadiene and potassium p-styrylundecanoate relatively rich in the latter component. In the earlier stages of the emulsion polymerization the locus of the polymerization is the soap micelle, in which the proportion of potassium p-styrylundecanoate to butadiene is much higher than in the charge as a whole. The copolymer formed in the micelles, designated as copolymer soap, is completely or partially soluble in ethanol depending on the exact copolymer composition. The difference between the determination of extracted soap by titration and by spectrophotometry represents the amount of copolymer soap that is extracted into the ethanol, since this copolymer soap exhibits a titration behavior similar to that of the monomeric potassium p-styrylundecanoate, but does not exhibit an absorption maximum at 253 millimicrons. As the conversion increases the differences between the results of these two determinations becomes smaller, indicating greater coprecipitation of the copolymer soap with the poly-butadiene, both mechanically and because of the cross linking between the initially formed copolymer soap and the subsequently formed poly-butadiene.

In the re-precipitation of the polymer prior to the spectrophotometric determination of the bound soap in the polymer, about half of the polymer is lost (i. e. is soluble in the ethanol-chloroform solution). This lost polymer includes all the copolymer soap which is not extracted into the ethanol during the coagulation step. The spectrophotometrically determined value of soap copolymerized (column 4 of Table I) therefore represents the percentage of potassium p-styrylundecanoate which enters the butadiene rich copolymer formed during the later stages of conversion. The sum of the values in the third and fourth columns of Table I is 56%±1% at all three conversions; the remainder of the soap, namely 44%, must represent the percentage of soap which entered into the copolymer soap in the initial stages of the reaction.

EXAMPLES 2–9

Ingredients were charged into pressure vessels according to the formula of Table II. These ingredients were agitated at the indicated temperatures and samples were withdrawn and analyzed for conversion and extracted soap (by titration) according to the procedures given above; the results are given in Table III.

Table II.—Examples 2–6, all at 5° C.

| Example | 2 | 3 | 4 | 5 | 6 |
|---|---|---|---|---|---|
| Butadiene | 100 | 70 | 70 | 70 | 70 |
| Styrene | | 30 | 30 | 30 | 30 |
| Water | 140 | 140 | 140 | 140 | 140 |
| p-Styrylundecanoic acid | 3.18 | 3.18 | 6.36 | | |
| 10-Acrylamidostearic acid | | | | 3.58 | |
| 12-Acrylamidostearic acid | | | | | 3.50 |
| Potassium hydroxide | equiv. | equiv. | equiv. | equiv. | equiv. |
| Viscosity control agent | 0.3 | 0.3 | 0.3 | 0.3 | 0.3 |
| Chain Transfer agent | 0.25 | 0.10 | 0.10 | 0.10 | 0.40 |
| Initiator | 0.1525 | 0.1525 | 0.1525 | 0.1525 | 0.1525 |

Table II–A.—Examples 7–9, all at 50° C.

| Example | 7 | 8 | 9 |
|---|---|---|---|
| Butadiene | 100 | 70 | 70 |
| Styrene | | 30 | 30 |
| Water | 140 | 140 | 140 |
| p-Styrylundecanoic acid | 3.18 | | |
| 10-Acrylamidostearic acid | | 3.83 | |
| 12-Acrylamidostearic acid | | | 3.50 |
| Potassium hydroxide | equiv. | equiv. | equiv. |
| Chain Transfer agent | 0.5 | 0.2 | 0.5 |
| Initiator | 0.3 | 0.3 | 0.3 |

Table III—Soap extracted from latices of Examples 2–9

"C" denotes percent conversion;
"E" denotes percent of soap taken which was extracted in ethanol during coagulation of the latex, as determined by titration.

| Example 2 | | Example 3 | | Example 4 | | Example 5 | | Example 6 | | Example 7 | | Example 8 | | Example 9 | |
|---|---|---|---|---|---|---|---|---|---|---|---|---|---|---|---|
| C, percent | E, percent | C, percent | E, percent | C, percent | E, percent | C, percent | E, percent | C, percent | E, percent | C, percent | E, percent | C, percent | E, percent | C, percent | E, percent |
| 31 | 61 | 40 | 75 | 3 | 82 | 30 | 104 | 34 | 100 | 60 | 42 | 90 | 55 | 70 | 77 |
| 37 | 54 | 63 | 57 | 14 | 77 | 78 | 79 | 61 | 93 | 76 | 36 | 94 | 60 | 78 | 74 |
| 54 | 45 | 74 | 49 | 68 | 53 | | 83 | 78 | 100 | 25 | | | | 93 | 58 |
| 95 | 29 | 85 | 44 | | | | | 93 | 58 | | | | | | |
| | | | | | | | | 96 | 52 | | | | | | |
| | | | | | | | | 97 | 37 | | | | | | |

From Example 1, the percent of soap extracted, as determined by titration, includes both monomeric soap and copolymer soap. Therefore, the difference between 100% and this value E represents the lower limit to be set on the percent of soap chemically bound in the copolymer, whereby the term "copolymer" denotes all polymer formed in the reaction, of whatever ratio of vinyl emulsifying agent to vinyl monomer.

Examples 1 and 2 show comparable results in polybutadiene latices prepared with different amounts of mercaptan. Example 3 shows the incorporation of potassium p-styrylundecanoate into a butadiene-styrene copolymer. Example 4 shows that with double the usual amount of potassium p-styrylundecanoate, the percentage of soap incorporated into the polymer remains unchanged. Example 5 shows the incorporation of a different vinyl emulsifying agent, potassium 10-acrylamidostearate, into a butadiene styrene copolymer. Examples 7 to 9 give the results of polymerizations carried out at different temperature and with a different initiating system than in the previous examples. Examples 7, 8 and 9 show the use of three different vinyl emulsifying agents in butadiene and butadiene-styrene emulsion polymerization. In Examples 7–9 potassium peroxydisulfate was used as an initiator.

EXAMPLE 10

As examples of the coagulation of vinyl emulsifying agent latices, the latices of Examples 1 to 9 have been coagulated by pouring dropwise into ethanol thus producing a fine crumb. In this crumb the polymer contains bound vinyl emulsifying agent, as the potassium soap. These latices have also been coagulated with acidified isopropanol, also forming a fine crumb. In this process the vinyl emulsifying agent is transformed to the acid state, so that the copolymer contains bound long-chain acid molecules rather than bound soap molecules.

These latices have also been coagulated with calcium nitrate by the coagulant dip process. Films of 10 to 15 mil thickness were formed. In these films and in the dried polymer obtained thereof the bound vinyl emulsifying agent had been transformed to the calcium salt.

As further examples of the preparation of solid polymer from latex, the latex of Example 6 was coagulated by dropwise addition of 0.5 N hydrochloric acid to the latex at 20% total solids concentration. Another portion of this latex was coagulated by the addition of 10% sodium chloride. Another portion of this latex was coagulated by the addition of aluminum ammonium sulfate.

PROPERTIES OF LATEX PREPARED WITH VINYL EMULSIFYING AGENTS

Example 3 represents a typical butadiene-styrene latex showing the advantageous properties obtainable by the use of a vinyl emulsifying agent. A portion of this latex was withdrawn at 81% conversion, shortstopped with potassium dimethyldithiocarbamate, vented to remove butadiene, and steam distilled to strip off the styrene. The total solids concentration was adjusted to 40.8%. The pH of the latex was 10.3; the turbidity (standard RFC method) was 0.172; and the surface tension was 71.8 dynes/cm. The first two properties are in the range normally found for a latex prepared under similar conditions with an ordinary soap such as potassium oleate; however, the surface tension is unusually high as compared with an oleate latex. This high surface tension is indicative of the very low monomeric soap content of the latex, and is typical of latices prepared with vinyl emulsifying agents under such conditions that a major portion of the vinyl emulsifying agent has entered the copolymer. The latex had the useful property of being pressure-sensitive. Latices so prepared may be concentrated by usual methods such as evaporation or creaming.

A unique property of the vinyl emulsifying agent latices as compared with ordinary synthetic latices, is the cohesiveness of the dried film. The latex prepared with ordinary soap is better described as adhesive, rather than cohesive; this adhesiveness or "blocking" is detrimental in the application in which cohesiveness is desirable, such as in self-sealing envelopes, shirt bands, etc. The "blocking" was not exhibited by the latex in Example 3.

Another unique property of the vinyl soap latices is the resistance of the dried film to water spotting. This resistance develops immediately upon air drying in contrast to a latex prepared with a volatile base soap such as an amine or ammonium fatty acid soap, which develops resistance to water spotting only upon heat treatment sufficient to decompose the soap. Latices prepared with sodium or potassium soap of the ordinary type do not develop resistance to water spotting even by heating.

Vinyl soap latices especially those made at high conversion show excellent retention of strength in saturated papers when such saturated paper is tested for tensile properties while wet. In one example a 100% conversion product containing 3.18% of vinyl soap in the monomer charge shows a wet tensile strength of 90% of the dry value in such a test. The latex made with a similar amount of soap of a normal variety retains only about 5% of its dry strength when tested wet. This improved tensile property imparted to a saturated paper may be obtained in the use of vinyl soap latices without any high temperature drying effects. This example in saturated paper therefore, indicates the application of these products in conditions where exposure to moisture would be common.

Good cohesiveness is also exhibited by the latices of several of the other examples given above, such as Nos. 5, 6 and 9, at 75%, 100% and 95% conversion, respectively. Latices Nos. 5 and 6 exhibit good resistance to water spotting. The essential importance of the present invention is that useful properties, such as cohesiveness and resistance to water spotting, are obtained in a suitably balanced polymerization formula using a vinyl emulsifying agent; whereas with a conventional emulsifying agent, comparable formulae do not give these useful properties, and indeed no formula has as yet been found in the art which will yield these properties with a conventional emulsifying agent.

It is of course understood that the application of vinyl emulsifying agents is not limited to the examples given, either with regard to the particular vinyl emulsifying agents employed, or the monomers, or other ingredients of the formula, or conditions of polymerization. The invention lies in the use of any vinyl emulsifying agent, defined as above, in the emulsion polymerization of any vinyl or vinylidene monomer. The useful properties of latex and polymer prepared in the manner of this invention are also not limited to those described above, but other unique properties are also inherent in these latices and polymers by virtue of their unique character.

The latices produced by vinyl emulsifying agents may be coagulated and washed by methods well known in the art, including salt and acid coagulation. Such products, as is customary may require antioxidant additives before coagulation, washing and drying. By variation of kind and amount of modifier, the viscosity of the dry polymer can be controlled to allow ready processibility in rubber milling equipment. These products may also be varied as regards conversion and gel content, and may be stripped, prior to coagulation, in standard manners.

A vinyl emulsifying agent is in itself polymerizable. This invention shows that when used as an emulsifying agent in a monomer system to be emulsion polymerized, this vinyl emulsifying agent is capable of resulting in a normal polymerization of the monomer system and maintains stability during the reaction, as shown by absence of floc or coagulum. In addition, the vinyl emulsifying agent itself becomes chemically bonded to the main polymer and gives new and improved properties to the latex polymer or its coagulated product.

As will be evident to those skilled in the art, various modifications of this invention can be made or followed in the light of the foregoing disclosure or discussion without departing from the spirit or scope of the disclosure or from the scope of the claims.

What is claimed is:

1. A synthetic latex comprising a colloidal aqueous suspension of a copolymer of 1,3-butadiene, styrene and a vinyl emulsifying agent, comprising a water soluble soap of an acid selected from the group consisting of p-styrylundecanoic acid, 10-acrylamidostearic acid, p-acrylylphenylundecanoic acid, 10-acryloxystearic acid and 12-acryloxystearic acid.

2. A synthetic latex comprising a colloidal aqueous suspension of a copolymer of at least two vinyl monomers, at least one of said monomers being a vinyl emulsifying agent, comprising a water soluble soap of an acid selected from the group consisting of p-styrylundecanoic acid, 10-acrylamidostearic acid, p-acrylylphenylundecanoic acid, 10-acryloxystearic acid and 12-acryloxystearic acid and at least one of said monomers being a monomer other than said vinyl emulsifying agent.

3. A synthetic latex comprising a colloidal aqueous suspension of a polymer of vinyl monomers characterized by a vinyl emulsifying agent comprising a water soluble soap of an acid selected from the group consisting of p-styrylundecanoic acid, 10-acrylamidostearic acid, p-acrylylphenylundecanoic acid, 10-acryloxystearic acid and 12-acryloxystearic acid being chemically bound to the polymer.

4. A synthetic latex comprising a colloidal aqueous suspension of a copolymer of 1,3-butadiene, styrene and a vinyl emulsifying agent comprising a water soluble soap of an acid selected from the group consisting of p-styrylundecanoic acid, 10-acrylamidostearic acid, p-acrylylphenylundecanoic acid, 10-acryloxystearic acid and 12-acryloxystearic acid characterized by the vinyl emulsifying agent being chemically bound by the polymer.

5. A synthetic latex comprising a colloidal aqueous suspension of a polymer of vinyl monomers in which the colloidal stabilizing agent is the water soluble soap of p-styrylundecanoic acid, partially in a monomeric and partially in a polymerized form.

6. A synthetic latex comprising a colloidal aqueous suspension of a polymer of vinyl monomers in which the colloidal stabilizing agent is the water soluble soap of p-styrylundecanoic acid, a portion of which is chemically bound to a polymer.

7. A synthetic latex comprising a colloidal aqueous suspension of a polymer of vinyl monomers in which the colloidal stabilizing agent is the water soluble soap of 10-acrylamidostearic acid, a portion of which is chemically bound to a polymer.

8. A synthetic latex comprising a colloidal aqueous suspension of a polymer of vinyl monomers in which the colloidal stabilizing agent is the water soluble soap of p-acrylylphenylundecanoic acid, a portion of which is chemically bound to a polymer.

9. A synthetic latex comprising a colloidal aqueous suspension of a polymer of vinyl monomers in which the colloidal stabilizing agent is the water soluble salt of 10-acryloxystearic acid, a portion of which is chemically bound to a polymer.

10. A synthetic latex comprising a colloidal aqueous suspension of a polymer of vinyl monomers in which the colloidal stabilizing agent is the water soluble soap of 12-acrylamidostearic acid, a portion of which is chemically bound to the polymer.

11. The process of subjecting to polymerization vinyl monomers in a dispersing medium with a vinyl emulsifying agent comprising a water soluble soap of an acid selected from the group consisting of p-styrylundecanoic acid, 10-acrylamidostearic acid, p-acrylylphenylundecanoic acid, 10-acryloxystearic acid and 12-acryloxystearic acid.

12. The process of subjecting to polymerization in an aqueous suspension vinyl monomers with a vinyl emulsifying agent comprising a water soluble soap of an acid selected from the group consisting of p-styrylundecanoic acid, 10-acrylamidostearic acid, p-acrylylphenylundecanoic acid, 10-acryloxystearic acid and 12-acryloxystearic acid.

13. The process of subjecting to polymerization an aqueous emulsion of 1,3-butadiene, styrene and a vinyl emulsifying agent comprising a water soluble soap of an acid selected from the group consisting of p-styrylundecanoic acid, 10-acrylamidostearic acid, p-acrylylphenylundecanoic acid, 10-acryloxystearic acid and 12-acryloxystearic acid.

14. The process of subjecting to polymerization an aqueous emulsion of 1,3-butadiene, styrene and a water soluble soap of 10-acrylamidostearic acid.

15. The process of subjecting to polymerization an aqueous emulsion of 1,3-butadiene, styrene and a water soluble soap of p-styrylundecanoic acid.

16. The process of mixing vinyl monomers together with a dispersing medium and a vinyl emulsifying agent comprising a water soluble soap of an acid selected from the group consisting of p-styrylundecanoic acid, 10-acrylamidostearic acid, p-acrylylphenylundecanoic acid, 10-acryloxystearic acid and 12-acryloxystearic acid, and subjecting this mixture to polymerizing conditions whereby copolymerization of the vinyl monomers together with the said vinyl emulsifying agent takes place.

17. The process as described in claim 16, wherein said vinyl monomers are styrene and 1,3-butadiene.

No references cited.